(12) United States Patent
Oomori

(10) Patent No.: US 11,374,350 B2
(45) Date of Patent: Jun. 28, 2022

(54) WATERPROOF COMMUNICATION CABLE

(71) Applicant: SUMITOMO WIRING SYSTEMS, LTD., Mie (JP)

(72) Inventor: Hiroyuki Oomori, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 17/021,074

(22) Filed: Sep. 15, 2020

(65) Prior Publication Data

US 2021/0091506 A1 Mar. 25, 2021

(30) Foreign Application Priority Data

Sep. 24, 2019 (JP) .............................. JP2019-173042

(51) Int. Cl.
  *H01R 13/52* (2006.01)
  *H01R 13/502* (2006.01)
  *H02G 3/04* (2006.01)
  *H01R 43/20* (2006.01)

(52) U.S. Cl.
  CPC ....... *H01R 13/5208* (2013.01); *H01R 13/502* (2013.01); *H01R 43/20* (2013.01); *H02G 3/0468* (2013.01)

(58) Field of Classification Search
  CPC .. H01R 13/5205; H01R 13/521; H01R 43/20; H01R 13/5208; H02G 3/088; H02G 3/0468
  See application file for complete search history.

(56) References Cited

U.S. PATENT DOCUMENTS

| 4,735,581 | A | * | 4/1988 | Endo | .................. | H01R 13/5205 |
| | | | | | | 439/279 |
| 4,895,533 | A | * | 1/1990 | Yagi | ................... | H01R 13/5205 |
| | | | | | | 439/278 |
| 5,573,429 | A | * | 11/1996 | Miyazaki | ........... | H01R 13/5205 |
| | | | | | | 439/587 |
| 7,104,840 | B2 | * | 9/2006 | Murakami | ......... | H01R 13/6277 |
| | | | | | | 439/272 |

(Continued)

FOREIGN PATENT DOCUMENTS

| JP | 2008282631 A | * | 11/2008 | ........... H01R 13/567 |
| JP | 2018-160315 A | | 10/2018 | |
| WO | WO-2018173688 A1 | * | 9/2018 | |

*Primary Examiner* — Abdullah A Riyami
*Assistant Examiner* — Nader J Alhawamdeh
(74) *Attorney, Agent, or Firm* — Venjuris, P.C.

(57) ABSTRACT

A communication cable is provided with a communication line, a terminal portion connected to an end part of the communication line, a housing for accommodating the terminal portion, a waterproof rubber plug and a holder. The rubber plug is held in close contact with an outer periphery of the communication line and partially accommodated in the housing. The holder is mounted on the housing to hold the rubber plug. The rubber plug includes a close-contact portion and an outer side portion located behind the close-contact portion and outside the housing. The close-contact portion is located behind the terminal portion and held in close contact with the outer periphery of the communication line and an inner surface of the housing. The holder covers an outer peripheral surface of the outer side portion over an entire periphery. The holder is divided into a first member and a second member.

9 Claims, 10 Drawing Sheets

(56) References Cited

U.S. PATENT DOCUMENTS

| | | | |
|---|---|---|---|
| 9,577,367 B2* | 2/2017 | Campbell | H01R 13/5205 |
| 10,148,032 B1* | 12/2018 | Brantingham | F16L 5/10 |
| 10,644,435 B2* | 5/2020 | Oomori | H01R 13/422 |
| 10,714,868 B2* | 7/2020 | Maesoba | H01R 13/5221 |
| 10,833,444 B2* | 11/2020 | Maesoba | H01R 13/4365 |
| 10,873,152 B2* | 12/2020 | Kang | H01R 13/506 |
| 11,056,836 B2* | 7/2021 | Maesoba | H01R 13/6581 |
| 2021/0091506 A1* | 3/2021 | Oomori | H02G 3/0468 |

* cited by examiner

WATERPROOF COMMUNICATION CABLE

CROSS-REFERENCE TO RELATED APPLICATIONS

This application is based on and claims priority from Japanese Patent Application No. 2019-173042, filed on Sep. 24, 2019, with the Japan Patent Office, the disclosure of which is incorporated herein in their entireties by reference.

TECHNICAL FIELD

The present disclosure relates to a communication cable.

BACKGROUND

Japanese Patent Laid-open Publication No. 2018-160315 describes a technique for waterproofing a communication cable.

SUMMARY

As described in Japanese Patent Laid-open Publication No. 2018-160315, it is desirable to enhance the waterproof performance of a communication cable. On the other hand, it is also desired to improve the assemblability of the communication cable.

Accordingly, it is aimed to provide a technique capable of improving the assemblability of a communication cable while improving the waterproof performance of the communication cable.

The present disclosure is directed to a communication cable with a communication line, a terminal portion connected to an end part of the communication line, a housing for accommodating the terminal portion, a waterproof rubber plug to be held in close contact with an outer periphery of the communication line, the rubber plug being partially accommodated in the housing, and a holder to be mounted on the housing to hold the rubber plug, wherein the rubber plug includes a close-contact portion located behind the terminal portion, the close-contact portion being held in close contact with the outer periphery of the communication line and an inner surface of the housing, and an outer side portion located behind the close-contact portion and outside the housing, the holder covers an outer peripheral surface of the outer side portion over an entire periphery, and the holder is divided into a first member and a second member.

According to the present disclosure, it is possible to improve the assemblability of the communication cable while improving the waterproof performance of the communication cable.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
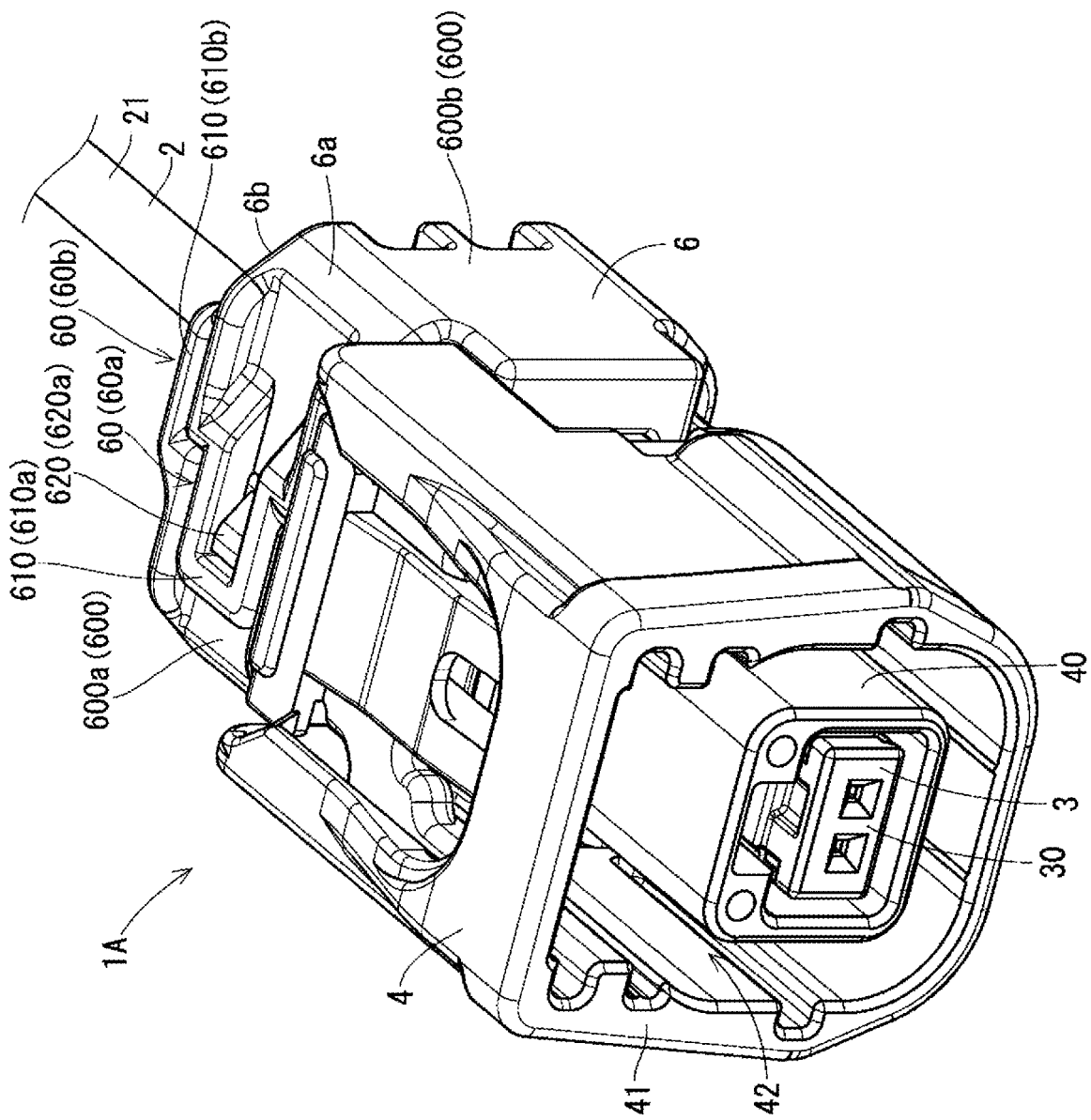
FIG. 1 is a perspective view showing an example of a communication cable according to a first embodiment.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

DESCRIPTION OF EMBODIMENTS OF PRESENT DISCLOSURE

First, embodiments of the present disclosure are listed and described.

A communication cable of the present disclosure is as follows.

(1) The communication cable is proved with a communication line, a terminal portion connected to an end part of the communication line, a housing for accommodating the terminal portion, a waterproof rubber plug to be held in close contact with an outer periphery of the communication line, the rubber plug being partially accommodated in the housing, and a holder to be mounted on the housing to hold the rubber plug, wherein the rubber plug includes a close-contact portion located behind the terminal portion, the close-contact portion being held in close contact with the outer periphery of the communication line and an inner surface of the housing, and an outer side portion located behind the close-contact portion and outside the housing, the holder covers an outer peripheral surface of the outer side portion over an entire periphery, and the holder is divided into a first member and a second member. According to the present disclosure, since the holder covers the outer peripheral surface of the outer side portion of the rubber plug over the entire periphery, the waterproof performance of the communication cable is improved. Further, since the holder is divided into the first and second members, the outer peripheral surface of the outer side portion of the rubber plug can be covered around with the holder after the terminal portion and the rubber plug are mounted on the communication line. Therefore, the assemblability of the communication cable is improved.

(2) The holder may cover an entire region of the outer peripheral surface of the outer side portion. In this case, since the holder covers the entire region of the outer peripheral surface of the outer side portion of the rubber plug, the waterproof performance of the communication cable is further improved.

(3) The first and second members may have the same shape. In this case, since first and second members have the same shape, the holder can be configured, using two identical members. Therefore, the component cost of the holder can be reduced.

(4) A rib to be contacted by a front surface of the rubber plug may be provided on the inner surface of the housing, and a surface of the rib to be contacted by the front surface may be located behind the terminal portion. In this case, since the surface of the rib to be contacted by the front surface is located behind the terminal portion, the contact of the rubber plug with the terminal portion can be prevented. Therefore, the damage of the rubber plug by the terminal portion is prevented.

(5) The first and second members may include a first coupling part, and the first coupling part may be provided on a rear surface of the holder. In this case, since the first coupling part of the first and second members is provided on the rear surface of the holder, a dimension of the holder along a longitudinal direction of the communication line can be reduced.

(6) The first and second members may include a second coupling part, and the second coupling part may be provided on an outer peripheral surface of the holder. In this case, since the holder is provided with the first and second coupling parts, the detachment of the first and second members is less likely to occur.

(7) The communication cable may further include a corrugated tube located behind the rubber plug, the corrugated tube covering the outer periphery of the communication line, and the holder may cover an outer periphery of the corrugated tube and holds the corrugated tube. In this case, since the corrugated tube can be held, utilizing the holder for holding the rubber plug, the number of components can be reduced.

Details of Embodiment of Present Disclosure

Specific examples of the communication cable of the present disclosure are described below with reference to the drawings. Note that the present invention is not limited to these illustrations and is intended to be represented by claims and include all changes in the scope of claims and in the meaning and scope of equivalents.

First Embodiment

<Configuration Example of Communication Cable>

Figure 2:
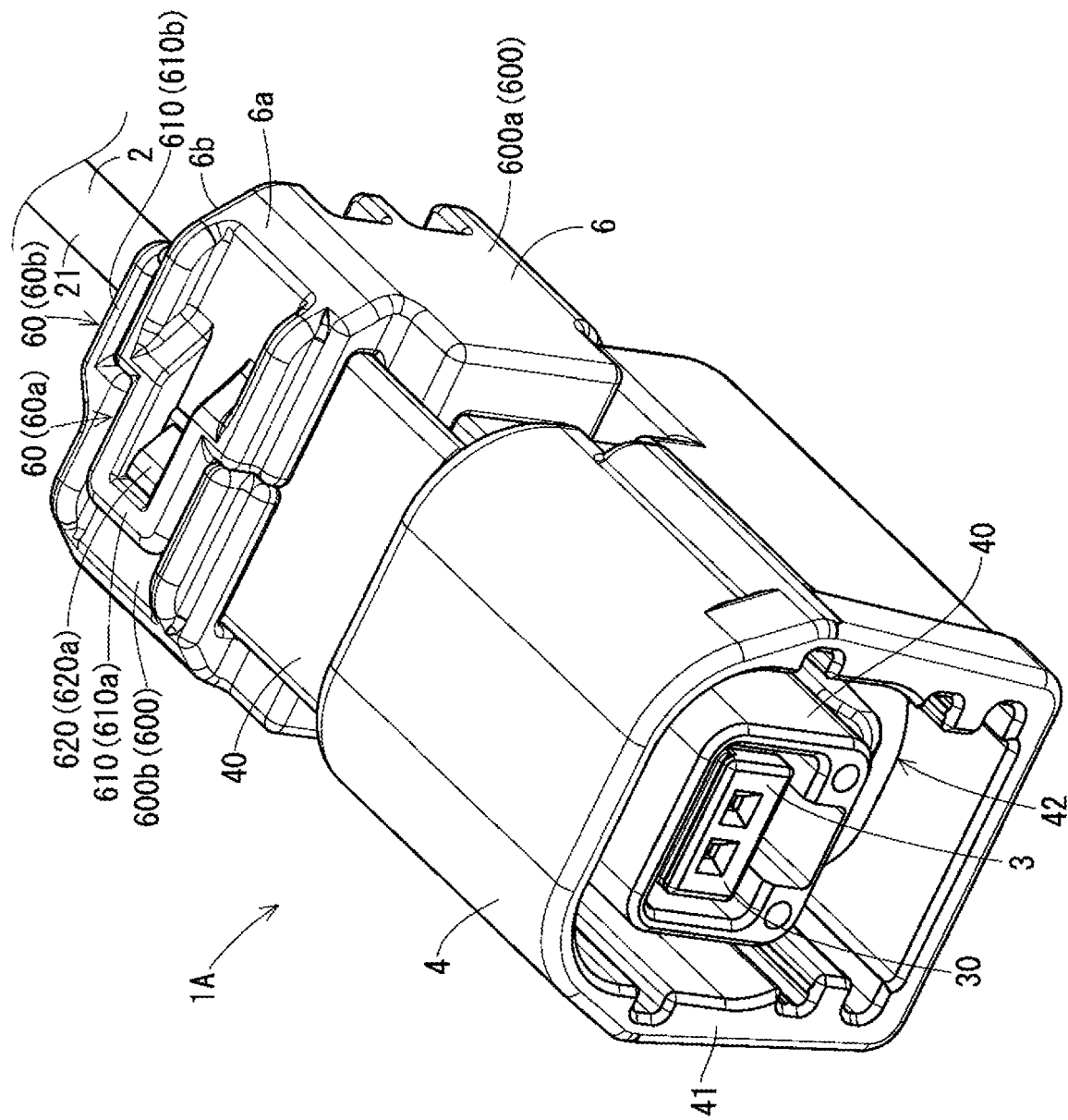
FIG. 2 is a perspective view showing the example of the communication cable according to the first embodiment.
Figure 3:
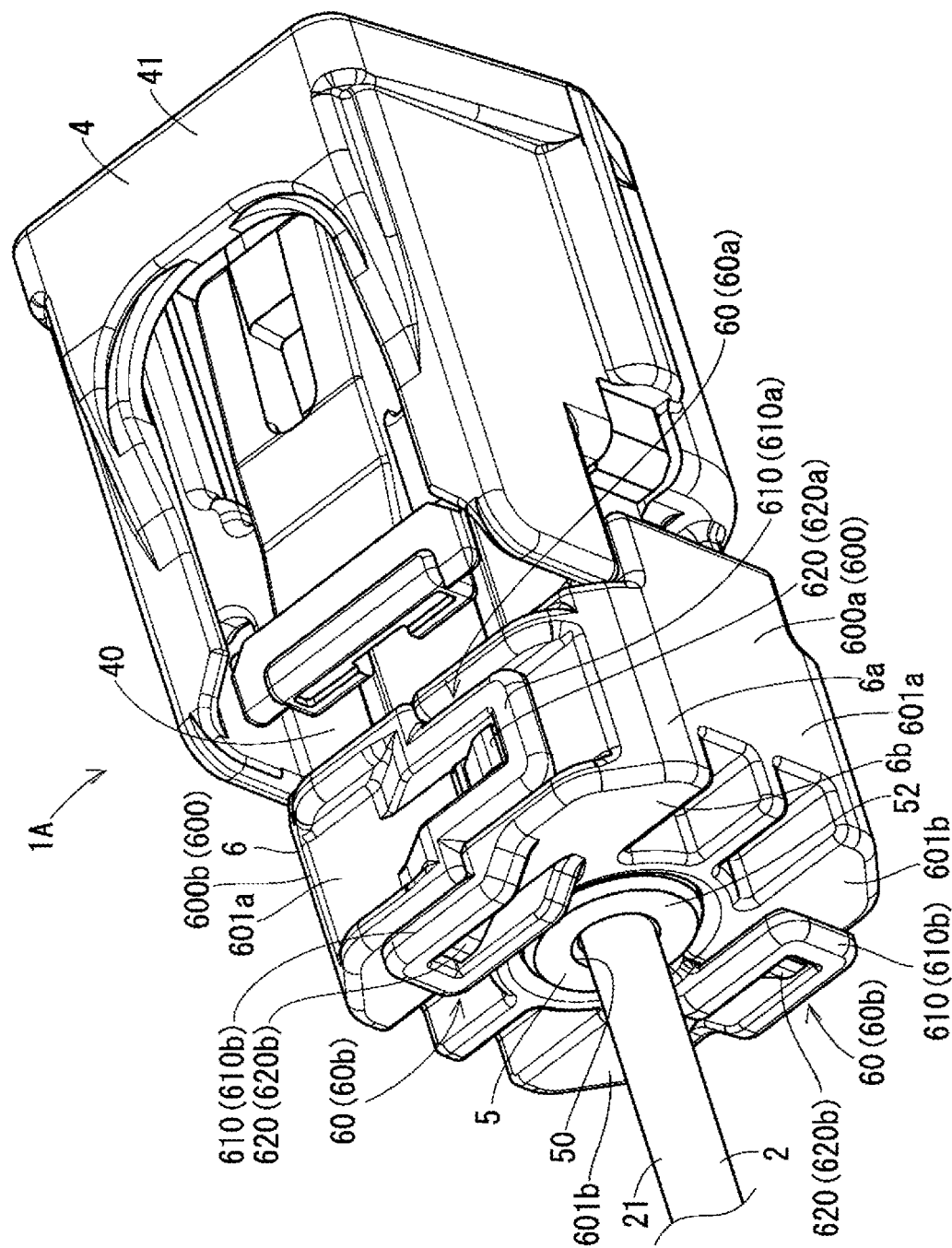
FIG. 3 is a perspective view showing the example of the communication cable according to the first embodiment.
Figure 4:
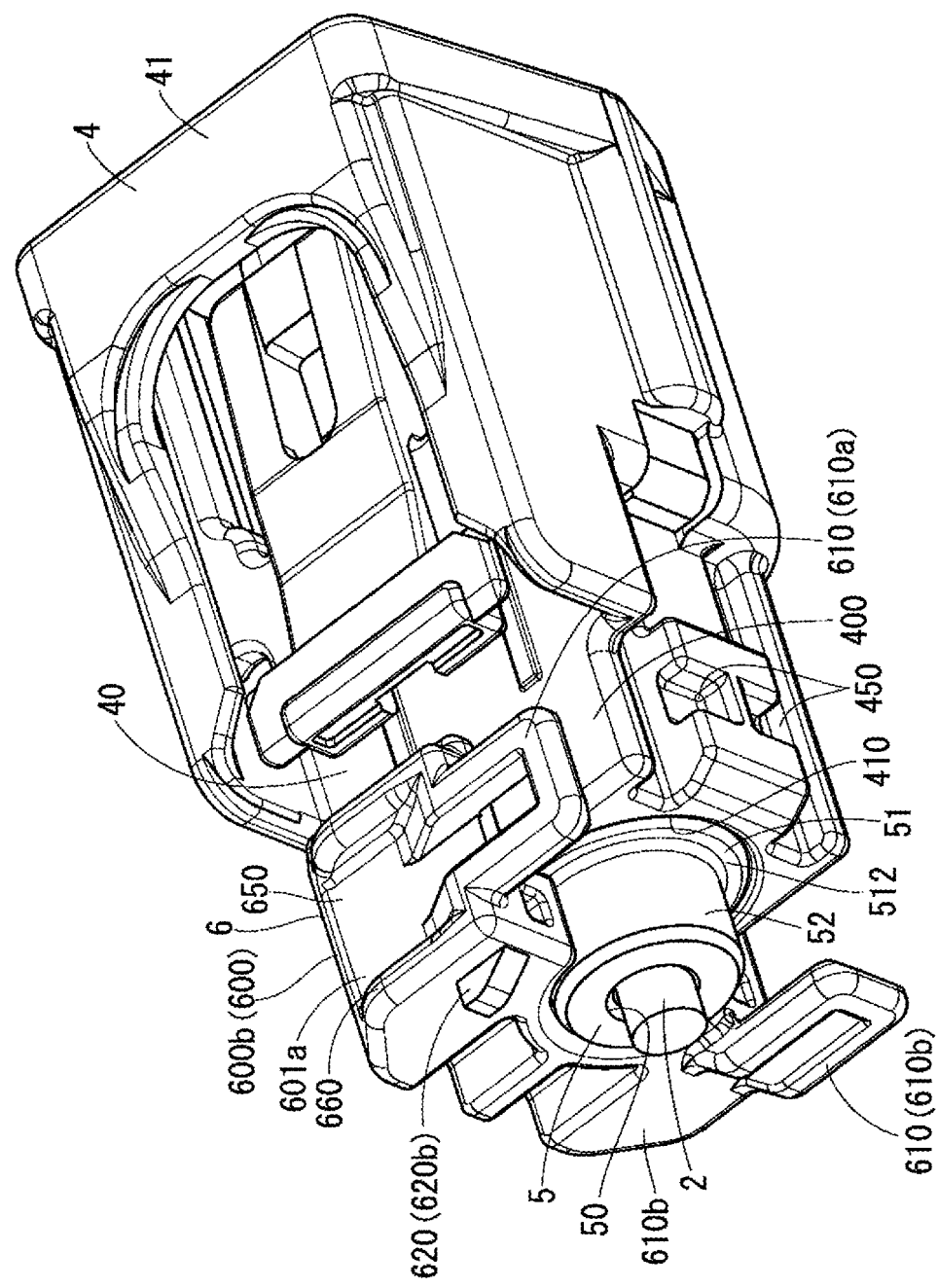
FIG. 4 is a perspective view showing the example of the communication cable according to the first embodiment.

Hereinafter, a communication cable 1A according to a first embodiment is described. FIG. 1 is a schematic perspective view showing one example of the communication cable 1A. FIG. 2 is a schematic perspective view showing a state where the communication cable 1A shown in FIG. 1 is turned 180° about a longitudinal direction thereof. FIG. 3 is a schematic perspective view showing a state where the communication cable 1A shown in FIG. 1 is so turned that the tip of a housing 4 of the communication cable 1 is located on a right side of FIG. 3. FIG. 4 is a schematic perspective view showing a state where a first member 600a of a holder 6 is removed from the communication cable 1A shown in FIG. 3. A communication line 2 is shown to be short in FIG. 4 for the convenience of description.

The communication cable 1A is used in communication between a certain device and another device, and electrically connects the certain device and the other device. The communication cable 1A is, for example, a communication cable used in communication having a transmission rate of 100 Mbps (bits per second) or higher. The communication cable 1, for example, conforms to Ethernet (registered trademark) standards. The communication cable 1, for example, conforms to 100BASE-T2. The communication cable 1A is, for example, mounted in an automotive vehicle.

Note that the communication cable 1A may be a communication cable used in communication having a transmission rate of higher than 100 Mbps. For example, the communication cable 1A may be a communication cable used in communication having a transmission rate of 1 Gbps. Further, the communication cable 1A may be a communication cable used in communication having a transmission rate of lower than 100 Mbps. Further, the communication cable 1A may not conform to the Ethernet standards. Further, the communication cable 1A may be used in a place other than automotive vehicles.

As shown in FIGS. 1 to 4, the communication cable 1A includes a communication line 2, a terminal portion 3 connected to an end part of the communication line 2, a housing 4 for accommodating the terminal portion 3, a waterproof rubber plug 5, and the holder 6 for holding the rubber plug 5. In the communication cable 1A, the entrance of water into the housing 4 can be prevented by the rubber plug 5. The rubber plug 5 is held in close contact with the outer periphery of the communication line 2 and partially accommodated in the housing 4. The holder 6 is mounted on the housing 4 to hold the rubber plug 5. The holder 6 is divided into the first member 600a and a second member 600b. That is, the holder 6 is composed of the first and second members 600a, 600b. The shapes of the first and second members 600a, 600b are, for example, identical. Hereinafter, the first and second members 600a, 600b may be respectively referred to as partial members 600 unless it is particularly necessary to distinguish these. Further, in the description of the communication cable 1A and a communication cable 1B to be described later, a front side means a tip side of the housing 4 and a rear side means an opposite side.

<Configuration Examples of Communication Line, Terminal Portion and Rubber Plug>

Figure 5:
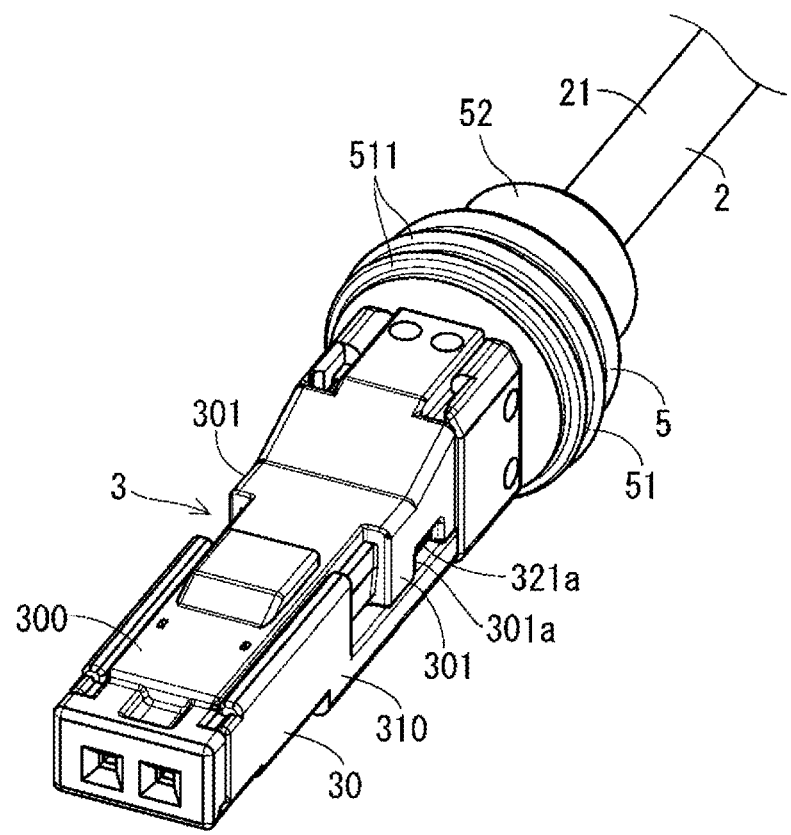
FIG. 5 is a perspective view showing examples of a communication line, a terminal portion and a rubber plug according to the first embodiment.
Figure 6:
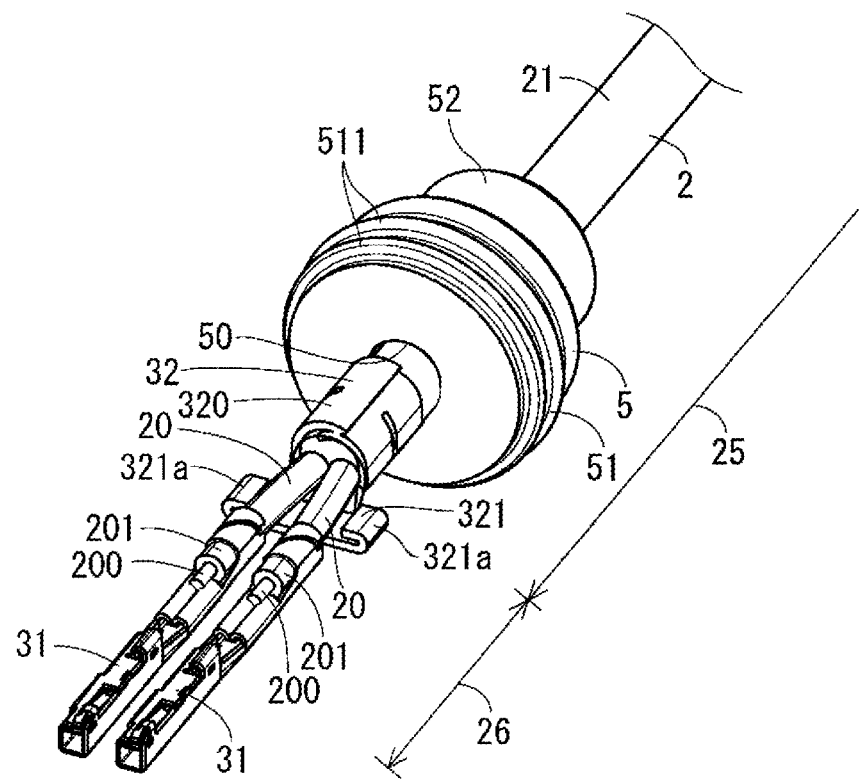
FIG. 6 is a perspective view showing the examples of the communication line, the terminal portion and the rubber plug according to the first embodiment.
Figure 7:
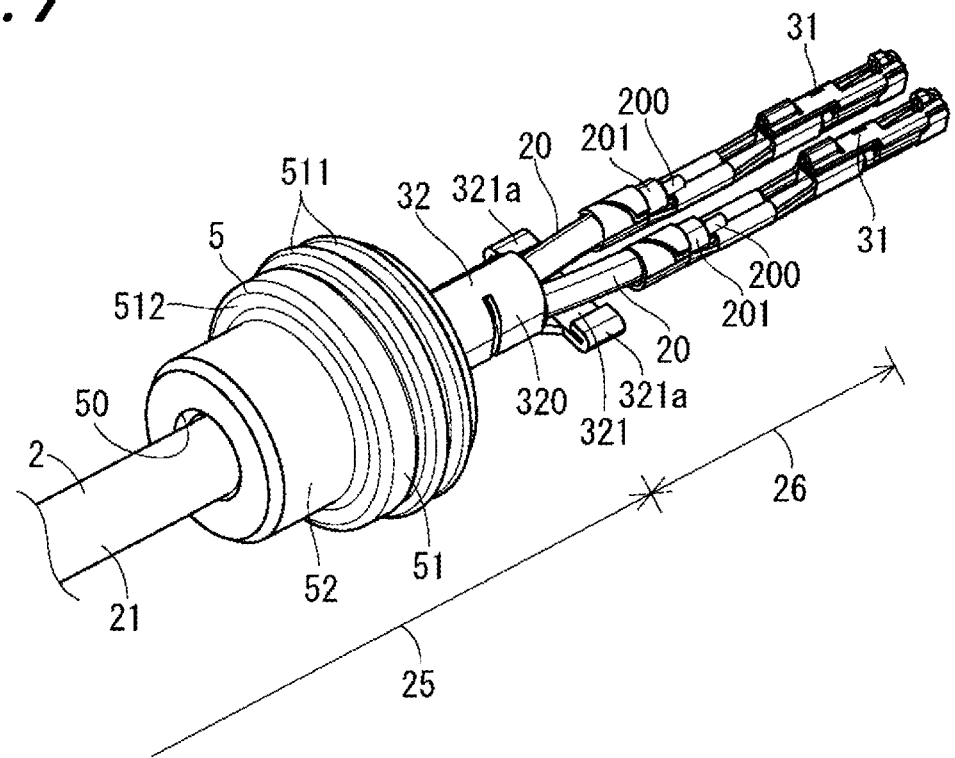
FIG. 7 is a perspective view showing the examples of the communication line, the terminal portion and the rubber plug according to the first embodiment.

FIG. 5 is a schematic perspective view showing an example of a state where the housing 4 and the holder 6 are removed from the communication cable 1A. FIG. 6 is a schematic perspective view showing an example of a state where a housing 30 of the terminal portion 3 is removed from a structure shown in FIG. 5. FIG. 7 is a schematic perspective view showing a state reached by turning a structure shown in FIG. 6 such that terminals 31 of the structure are located on a right side of FIG. 7.

The communication line 2 is, for example, a twisted pair cable. The communication line 2 is, for example, an UTP (Unshielded Twisted Pair) cable. The communication line 2 includes two wires 20 twisted each other. Further, the communication line 2 includes an insulation coating 21 for collectively covering the two wires 20. In this example, the communication line 2 includes no braided wire. That is, the two wires 20 are not covered with the braided wire. Further, the communication line 2 includes no drain wire. The wire 20 includes a core 200 made of metal and an insulation coating 201 covering the core 200.

The communication line 2 includes a twisted portion 25 formed by twisting the two wires 20 and an untwisted portion 26 extending from the twisted portion 25 and formed by untwisting the two wires 20. The untwisted portion 26 is located on an end part of the communication line 2. In the twisted portion 25, the two wires 20 are covered with the insulation coating 21. On the other hand, the two wires 20 are not covered with the insulation coating 21 in the untwisted portion 26.

The terminal portion 3 includes the housing 30, two terminals 31 made of metal and a crimping member 32 made of metal. The two terminals 31 are respectively connected to tip parts of the two wires 20 of the untwisted portion 26. The insulation coating 201 is stripped at the tip part of the wire 20 of the untwisted portion 26 to expose the core 200. The terminal 31 is crimped to an exposed part of the core 200 and the insulation coating 201 near the exposed part.

As shown in FIGS. 6 and 7, the crimping member 32 includes a barrel portion 320 to be crimped to an end part of the twisted portion 25 on the side of the untwisted portion 26. The crimping member 32 also includes a non-crimping portion 321 extending from the barrel portion 320 toward the untwisted portion 26 and not to be crimped to the communication line 2. Both end parts of the non-crimping portion 321 are folded 180°. In this way, a pair of hemming bent portions 321a are respectively formed on both ends of the non-crimping portion 321.

The housing 30 is, for example, made of insulating resin. As shown in FIG. 5, the housing 30 includes a body portion 300 open on one side and a cover portion 310 for covering an opening of the body portion 300. The body portion 300 accommodates the two terminals 31 and the crimping member 32. The cover portion 310 is mounted on the body portion 300 to cover the two terminals 31 and the crimping member 2 in the body portion 300.

The body portion 300 includes a pair of side wall portions 301 facing each other. Each of the pair of side wall portions 301 is provided with a cutout portion 301a. The crimping member 32 is so accommodated into the body portion 300 that the hemming bent portions 321a on the both ends thereof are respectively fit into the cutout portions 301a of the pair of side wall portions 301. In this way, the position of the crimping member 32 in a longitudinal direction of the communication line 2 is restricted. As a result, each terminal 31 mounted on the communication line 2 is less likely to come out from the housing 30. Further, by fitting the hemming bent portions 321a into the cutout portions 301a in the case of accommodating the crimping member 32 and the terminals 31 into the body portion 300, the crimping member 32 and the terminals 31 can be easily positioned in the body portion 300. Note that the shape of the crimping member 32 is not limited to the above example.

The rubber plug 5 is hollow and includes a through hole 50 through which the communication line 2 is passed. The rubber plug 5 includes a close-contact portion 51 located behind the terminal portion 3. The close-contact portion 51 is held in close contact with the outer periphery of the communication line 2 in a liquid-tight manner. Further, the close-contact portion 51 is held in close contact with the inner surface of the housing 4 in a liquid-tight manner. Furthermore, the rubber plug 5 includes an outer side portion 52 located behind the close-contact portion 51 and outside the housing 30. Each of the close-contact portion 51 and the outer side portion 52 has, for example, a hollow cylindrical shape. A diameter of the close-contact portion 51 is larger than that of the outer side portion 52. The close-contact portion 51 includes a through hole through which the communication line 2 is passed. The outer side portion 52 includes a through hole through which the communication line 2 is passed. The through hole of the close-contact portion 51 and that of the outer side portion 52 are connected to each other to constitute the through hole 50 of the rubber plug 5. The rear end surface of the close-contact portion 51 constitutes a ring-shaped protruding surface 512 protruding outward from the outer peripheral surface of the outer side portion 52 (see FIG. 7). The protruding surface 512 can also be said to be a flange surface.

The inner peripheral surface of the close-contact portion 51 is held in close contact with the outer periphery of the communication line 2 in a liquid-tight manner. Specifically, the inner peripheral surface of the close-contact portion 51 is held in close contact with the outer periphery of the insulation coating 21 of the twisted portion 25 of the communication line 2. On the other hand, the inner peripheral surface of the outer side portion 52 surrounds the insulation coating 21 of the twisted portion 25 of the communication line 2, but is not in close contact with the insulation coating 21.

A plurality of ring-like projections 511 are formed on the outer peripheral surface of the close-contact portion 51. The projections 511 are also called lip portions. In this example, two projections 511 are formed on the outer peripheral surface of the close-contact portion 51, but the number of the projections 511 is not limited to this. The plurality of projections 511 are held in close contact with the inner surface of the housing 4 in a liquid-tight manner.

Note that the communication line 2 may be an STP (Shielded Twisted Pair) cable. In this case, the communication line 2 may include a drain wire and a braided wire electrically connected to the drain wire. Further, if the communication line 2 includes the drain wire and the braided wire, the terminal portion 3 may include a shield member made of metal, configured to cover the housing 30 and electrically connected to the braided wire.

<Configuration Example of Housing for Accommodating Terminal Portion>

The housing 4 functions, for example, as a connector to which a mating connector is connected. As shown in FIGS. 1 to 4, the housing 4 includes a hollow accommodating portion 40 for accommodating the terminal portion 3. The housing 30 of the terminal portion 3 is surrounded around by the inner peripheral surface of the accommodating portion 40. Further, the housing 4 includes an outer side portion 41 surrounding the outer periphery of the accommodating portion 40. A space between the accommodating portion 40 and the outer side portion 41 constitutes a fitting space 42 into which the mating connector is fit (see FIGS. 1 and 2). A rubber ring for sealing a fitting part of the mating connector and the housing 4 is fit in a rear end part of the fitting space 42.

The close-contact portion 51 of the rubber plug 5 is accommodated in a rear end part 400 (see FIG. 4) of the accommodating portion 40. The plurality of projections 511 on the outer peripheral surface of the close-contact portion 51 are resiliently held in close contact with the inner peripheral surface of the rear end part 400. In this way, it is possible to prevent the entrance of water into the accommodating portion 40 through an opening 410 (see FIG. 4) in the rear end of the accommodating portion 40. As a result, the terminal portion 3 accommodated in the accommodating portion 40 can be prevented from getting wet.

Figure 8:
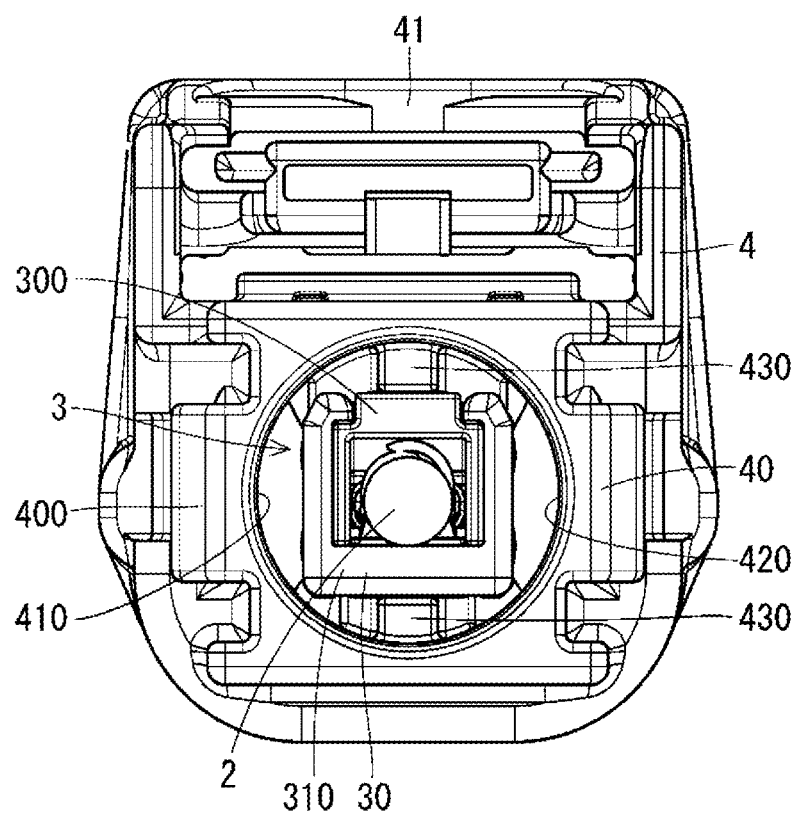
FIG. 8 is a back view showing the example of the communication cable according to the first embodiment.
Figure 9:
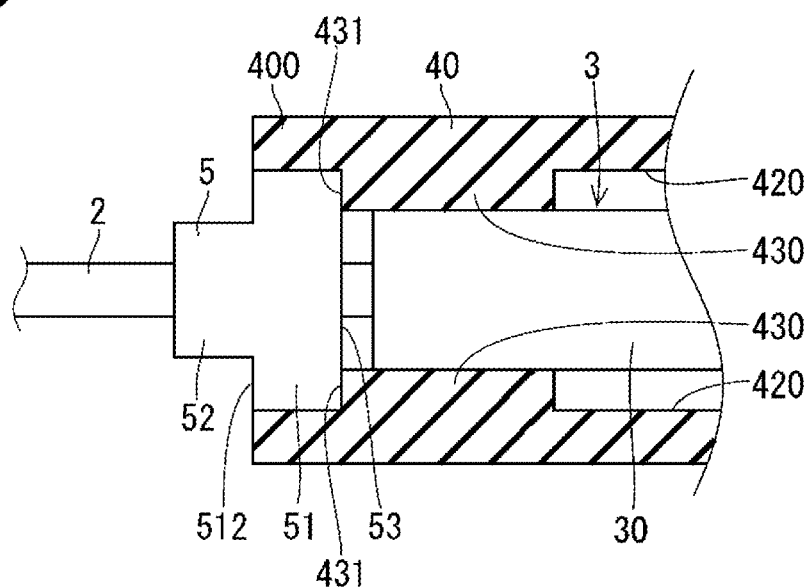
FIG. 9 is a view showing an example of a state inside a housing according to the first embodiment.

FIG. 8 is a schematic back view of the communication cable 1A having the holder 6 and the rubber plug 5 removed therefrom when viewed from a rear end side of the accommodating portion 40. FIG. 9 is a view schematically showing a state inside the accommodating portion 40 near the rear end part 400. A cross-section of the accommodating portion 40 is shown by hatching in FIG. 9. Further, the holder 6 is not shown in FIG. 9.

As shown in FIGS. 8 and 9, a plurality of ribs 430 to be contacted by a front surface 53 of the rubber plug 5 are formed on an inner surface (in other words, inner peripheral surface) 420 of the accommodating portion 40. Each rib 430 is, for example, integrally formed to the accommodating portion 40 and extends along the longitudinal direction of the communication line 2. In this example, two ribs 430 are formed on the inner surface 420 of the accommodating portion 40. The two ribs 430 are arranged to face each other in a direction orthogonal to the longitudinal direction of the communication line 2.

As shown in FIG. 9, surfaces 431 of the ribs 430 to be contacted by the front surface 53 of the rubber plug 5 are located behind the terminal portion 3. In this way, the contact of the rubber plug 5 with the terminal portion 3 is prevented. Therefore, the damage of the rubber plug 5 by the terminal portion 3 can be prevented.

Note that one, three or more ribs 430 may be provided. Further, the arranged positions of the ribs 430 are not limited to those of the example shown in FIGS. 8 and 9.

<Configuration Example of Holder>

As shown in FIGS. 1 to 4, the holder 6 is hollow and surrounds the outer peripheral surface of a part of the communication line 2. The holder 6 covers the outer peripheral surface of the outer side portion 52 of the rubber plug 5 over the entire periphery. In other words, the holder 6 continuously covers around the outer peripheral surface of the outer side portion 52 over the entire periphery in a circumferential direction. In this example, the holder 6 covers the entire region of the outer peripheral surface of the outer side portion 52 of the rubber plug 5. In this way, the outer peripheral surface of the outer side portion 52 of the rubber plug 5 is not exposed. The holder 6 may or may not be in contact with the outer peripheral surface of the outer side portion 52 of the rubber plug 5. If the holder 6 is in contact with the outer peripheral surface of the outer side portion 52, the holder 6 may be in contact with the outer peripheral surface of the outer side portion 62 over the entire periphery.

As described above, the holder 6 is divided into two partial members 600 having the same shape. The holder 6 is divided into the two partial members 600 along the longitudinal direction of the communication line 2. One partial member 600 covers one circumferential half of the outer peripheral surface of a part of the communication line 2, and the other partial member 600 covers the remaining circumferential half of the outer peripheral surface of the part of the communication line 2.

As shown in FIGS. 1 to 3, the two partial members 600 include a plurality of coupling parts 60. The plurality of coupling parts 60 include a plurality of coupling parts 60a provided on an outer peripheral surface 6a of the holder 6 and a plurality of coupling parts 60b provided on a rear surface 6b of the holder 60. In this example, two coupling parts 60a are provided on the outer peripheral surface 6a of the holder 6, and two coupling parts 60b are provided on the rear surface 6b of the holder 6. One coupling part 60a is located on a side opposite to and spaced 180° from the other coupling part 60a in a circumferential direction of the communication line 2. Further, one coupling part 60b is located on a side opposite to and spaced 180° from the other coupling part 60b in the circumferential direction of the communication line 2.

Hereinafter, for the two coupling parts 60a, one may be referred to as a first coupling part 60a and the other may be referred to as a second coupling part 60a. Further, for the two coupling parts 60b, one may be referred to as a third coupling part 60b and the other may be referred to as a fourth coupling part 60b.

The first coupling part 60a on the outer peripheral surface 6a and the third coupling part 60b on the rear surface 6b are located close to each other, and the second coupling part 60a on the outer peripheral surface 6a and the fourth coupling part 60b on the rear surface 6b are located close to each other. When the positions of the first and third coupling parts 60a, 60b are viewed along the longitudinal direction of the communication line 2, the first coupling part 60a is juxtaposed with the third coupling part 60b. Further, when the positions of the second and fourth coupling parts 60a, 60b are viewed along the longitudinal direction of the communication line 2, the second coupling part 60a is juxtaposed with the fourth coupling part 60b.

At each coupling part 60, a fitting projection 620 of the other partial member 600 is fit to a substantially U-shaped and cantilevered fitting piece 610 of the one partial member 600. The fitting projection 620 is inserted into the substantially U-shaped fitting piece 610 and fit to the fitting piece 610. The coupling part 60 can be said to be composed of the fitting piece 610 and the fitting projection 620 to be fit to the fitting piece 610. Note that the number of the coupling parts 60 is not limited to that in this example. Further, the positions where the coupling parts 60 are provided are not limited to those in this example.

Hereinafter, the fitting piece 610 and the fitting projection 620 constituting the coupling part 60a on the outer peripheral surface 6a of the holder 6 may be respectively called a fitting piece 610a and a fitting projection 620a. Further, the fitting piece 610 and the fitting projection 620 constituting the coupling part 60b on the rear surface 6b of the holder 6 may be respectively called a fitting piece 610b and a fitting projection 620b.

Figure 10:
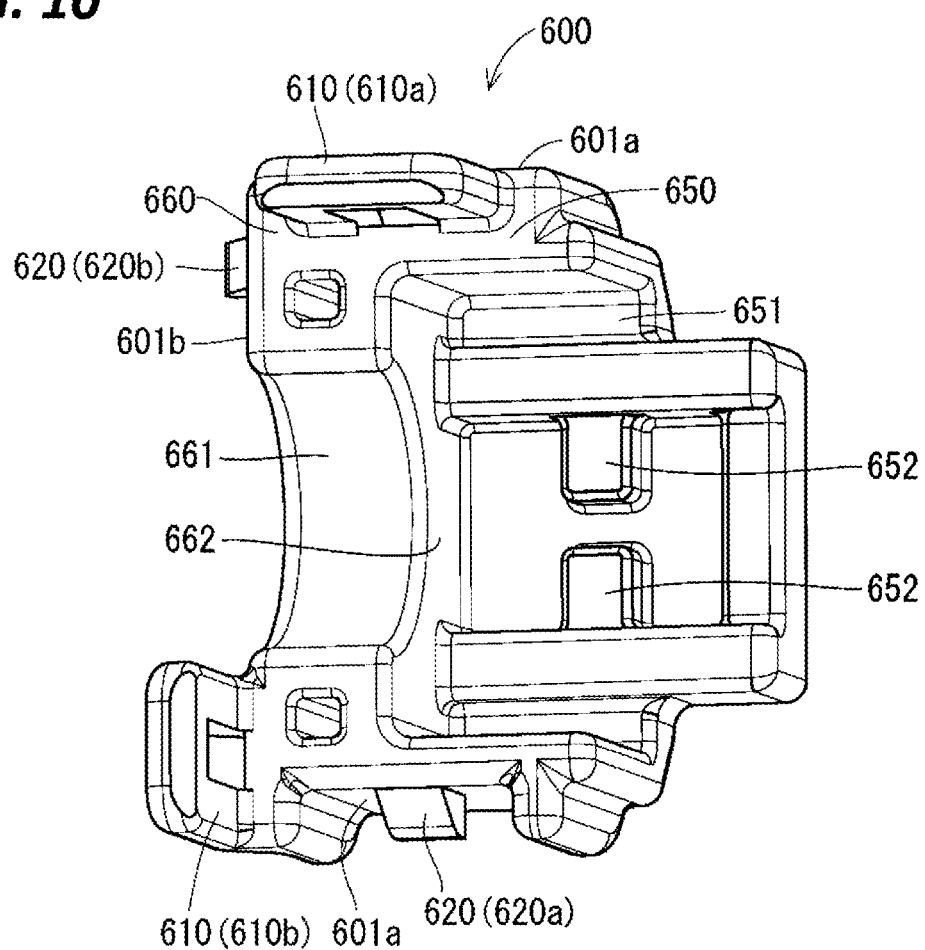
FIG. 10 is a perspective view showing an example of a partial member according to the first embodiment.

FIG. 10 is a schematic perspective view showing an example of the partial member 600. The outer shape of the partial member 600 is substantially U-shaped when viewed from front and rear surface sides thereof. Each partial member 600 includes a housing-side part 650 for partially covering the outer peripheral surface of the accommodating portion 40 of the housing 4 and a rubber plug-side part 660 for partially covering the outer peripheral surface of the outer side portion 52 of the rubber plug 5.

The housing-side part 650 covers one circumferential half of the outer peripheral surface of the rear end part 400 of the accommodating portion 40. The housing-side part 650 may or may not be in contact with the outer peripheral surface of the rear end part 400. The housing-side part 650 includes a plurality of fitting projections 652 on an inner peripheral surface 651 thereof. In this example, the housing-side part 650 includes two fitting projections 652.

As shown in FIG. 4, the rear end part 400 of the accommodating portion 40 includes two fitting recesses 450 to be respectively fit to the two fitting projections 652 of the housing-side part 650 in a region of the outer peripheral surface thereof to be covered with the housing-side part 650. By fitting the two fitting projections 652 of the housing-side part 650 respectively into the two fitting recesses 450 of the rear end part 400, the partial member 600 is positioned with respect to the housing 4.

The rear end part 400 of the accommodating portion 40 is provided with the two fitting recesses 450 to be fit to the two fitting projections 652 of the partial member 600 for each partial member 600. Thus, a total of four fitting recesses 450 are provided on the rear end part 400 of the accommodating portion 40.

The rubber plug-side part 660 covers one circumferential half of the outer peripheral surface of the outer side portion 52 of the rubber plug 5. The rubber plug-side part 660 is, for example, in contact with the entire region of the one circumferential half of the outer peripheral surface of the outer side portion 52 while covering this entire region. An inner peripheral surface 661 of the rubber plug-side part 660 has a semicircular shape. The inner peripheral surface 651 of the housing-side part 650 is located further outward than the inner peripheral surface 661 of the rubber plug-side part 660. Note that the rubber plug-side part 660 may not be in contact with the one half of the outer peripheral surface of the outer side portion 52.

A front surface 662 (see FIG. 10) of the rubber plug-side part 660 is connected to the inner peripheral surface 651 of the housing-side part 650. The front surface 662 covers one circumferential half of the protruding surface 512 behind the close-contact portion 51 of the rubber plug 5. The front surface 662 may or may not be in contact with the protruding surface 512. The rubber plug-side part 660 covers a part of the protruding surface 512 behind the close-contact portion 51, whereby the close-contact portion 51 is less likely to come out from the accommodating portion 40.

The partial member 600 includes one fitting projection 620*b* on a rear surface 601*b* thereof. The rear surface 601*b* of the partial member 600 can be said to be a rear surface of the rubber plug-side part 660. The partial member 600 also includes the fitting piece 610*b* projecting from the rear surface 601*b* thereof up to a rear surface 601*b* of the other partial member 600. The fitting piece 610*b* is located on a side opposite to and spaced 180° from the fitting projection 620*b* in the circumferential direction of the communication line 2.

Further, the partial member 600 includes one fitting projection 620*a* on an outer peripheral surface 601*a*. The partial member 600 also includes the fitting piece 610*a* projecting from the outer peripheral surface 601*a* thereof up to an outer peripheral surface 601*a* of the other partial member 600. The fitting piece 610*a* is located on a side opposite to and spaced 180° from the fitting projection 620*a* in the circumferential direction of the communication line 2.

The partial member 600 configured as described above is so mounted on the housing 4 that the two fitting projections 652 are respectively fit into the two fitting recesses 450 of the accommodating portion 40 while covering the one half of the outer peripheral surface of the rear end part 400 of the accommodating portion 40 of the housing 4 and the one half of the outer peripheral surface of the outer side portion 52 of the rubber plug 5. In the case of coupling the two partial members 600, the fitting projection 620*a* of the other partial member 600 is fit to the fitting piece 610*a* of the one partial member 600 and the fitting projection 620*a* of the one partial member 600 is fit to the fitting piece 610*a* of the other partial member 600 as shown in FIGS. 1 to 3. Further, as shown in FIG. 3, the fitting projection 620*b* of the other partial member 600 is fit to the fitting piece 610*b* of the one partial member 600 and the fitting projection 620*b* of the one partial member 600 is fit to the fitting pieces 610*b* of the other partial member 600.

In the first coupling part 60*a* on the outer peripheral surface 6*a* of the holder 6, the fitting piece 610*a* of the one partial member 600 projects up to the other partial member 600. On the other hand, in the second coupling part 60*a* on the outer peripheral surface 6*a* of the holder 6, the fitting piece 610*a* of the other partial member 600 projects up to the one partial member 600. In this way, it can be said that a projecting direction of the fitting piece 610*a* in the first coupling part 60*a* and that of the fitting piece 610*a* in the second coupling part 60*a* are opposite to each other.

Also on the rear surface 6*b* of the holder 6, a projecting direction of the fitting piece 610*b* in the third coupling part 60*b* and that of the fitting piece 610*b* in the fourth coupling part 60*b* are opposite to each other.

Further, the projecting direction of the fitting piece 610*a* in the first coupling part 60*a* on the outer peripheral surface 6*a* is opposite to that of the fitting piece 610*b* in the third coupling part 60*b* on the rear surface 6*b* near the first coupling part 60*a*. Further, the projecting direction of the fitting piece 610*a* in the second coupling part 60*a* on the outer peripheral surface 6*a* is opposite to that of the fitting piece 610*b* in the fourth coupling part 60*b* on the rear surface 6*b* near the second coupling part 60*a*.

The first and second members 600*a*, 600*b* have the same shape in the above example, but may have different shapes. In this case, one partial member 600 may cover a region smaller than half of the outer peripheral surface and the other partial member 600 may cover the remaining region of the outer peripheral surface in a circumferential direction of the outer peripheral surface of the outer side portion 52 of the rubber plug 5.

Further, the coupling parts 60 of the first and second members 600*a*, 600*b* may not be provided on the outer peripheral surface 6*a* of the holder 6. Further, the coupling parts 60 may not be provided on the rear surface 6*b* of the holder 6.

Further, the holder 6 may not cover a part of the outer peripheral surface of the outer side portion 52 if the holder 6 covers the outer peripheral surface of the outer side portion 52 over the entire periphery. In other words, the holder 6 may not cover a part of the outer peripheral surface of the outer side portion 52 if the holder 6 continuously covers the outer peripheral surface of the outer side portion 52 over the entire periphery. In this case, the holder 6 may cover, for example, the entire region of the outer peripheral surface of a front half of the outer side portion 52, but may not cover at least a part of the outer peripheral surface of a rear half of the outer side portion 52.

As just described, since the holder 6 covers the outer peripheral surface of the outer side portion 52 of the rubber plug 5 over the entire periphery in this example, the entrance of water into the accommodating portion 40 of the housing 4 can be prevented even if high-pressure water splashes near the housing 4. Therefore, the waterproof performance of the housing 4 is improved. Further, in this example, the holder 6 is divided into the first and second members 600*a*, 600*b*. In this way, after the terminal portion 3 and the rubber plug 5 are mounted on the communication line 2 and the terminal portion 3 is accommodated into the housing 4, the outer side portion 52 of the rubber plug 5 can be covered around by the holder 6. That is, after components other than the holder 6 are assembled in the communication cable 1A, the holder 6 can be mounted on these components. Therefore, the assemblability of the communication cable 1A is improved.

Further, if the holder 6 covers the entire region of the outer peripheral surface of the outer side portion 52 as in this example, the entrance of water into the accommodating portion 40 can be further prevented. Therefore, the waterproof performance of the housing 4 is further improved.

Further, since the first and second members 600a, 600b of the holder 6 have the same shape in this example, the holder 6 can be configured, using two identical members. Therefore, the component cost of the holder 6 can be reduced.

Further, in this example, the coupling parts 60b of the first and second members 600a, 600b are provided on the rear surface 6b of the holder 6. If the coupling parts 60b are juxtaposed with the coupling parts 60a along the longitudinal direction of the communication line 2 on the outer peripheral surface 6a of the holder 6, a dimension of the holder 6 along the longitudinal direction of the communication line 2 increases. By providing the coupling parts 60b on the rear surface 6b of the holder 6 as in this example, the dimension of the holder 6 along the longitudinal direction of the communication line 2 can be reduced.

Further, since the coupling parts 60 of the first and second members 600a, 600b are provided not only on the rear surface 6b of the holder 6, but also on the outer peripheral surface 6a of the holder 6 in this example, the detachment of first and second members 600a, 600b is less likely to occur.

Second Embodiment

Figure 11:
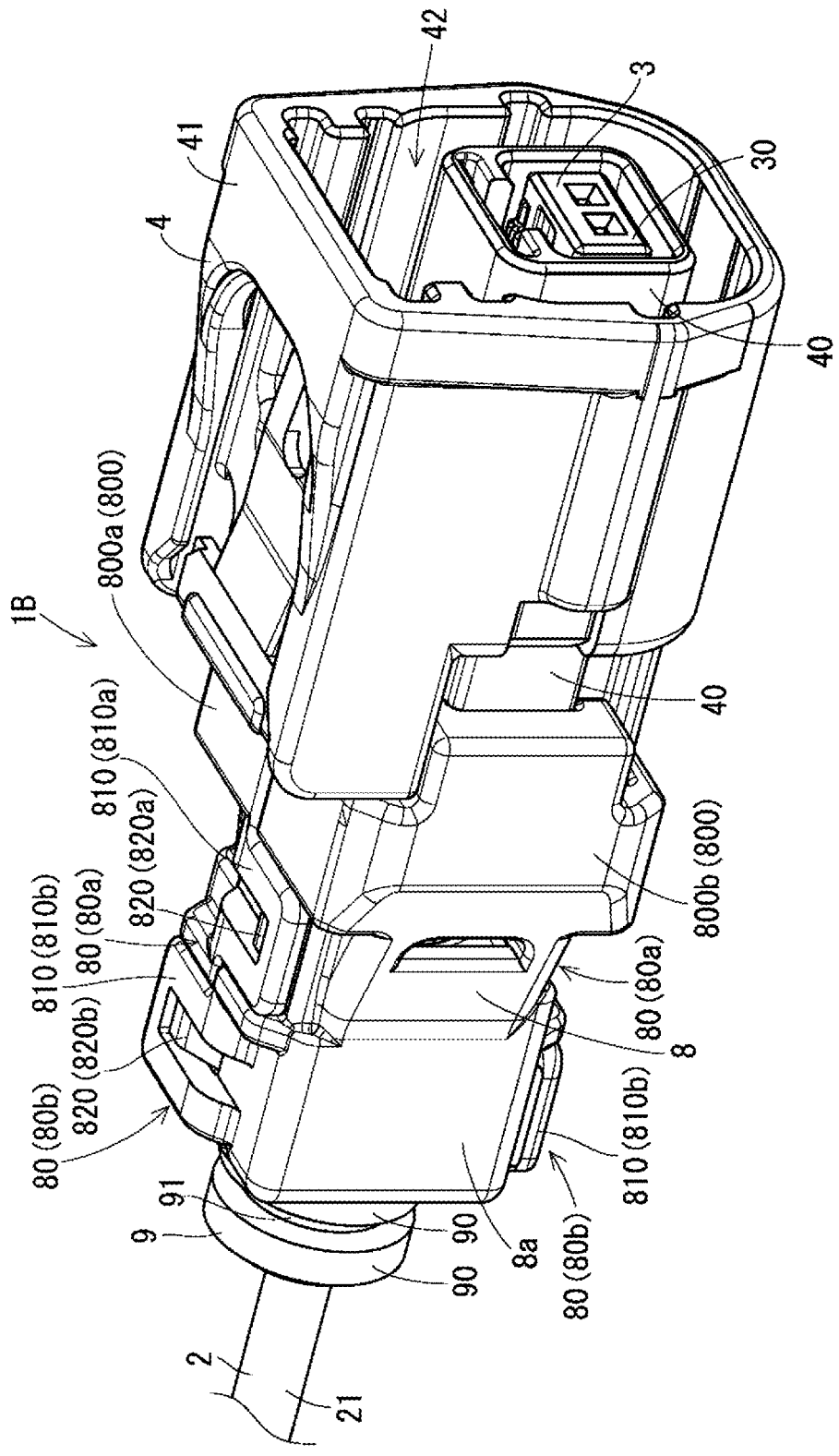
FIG. 11 is a perspective view showing an example of a communication cable according to a second embodiment.
Figure 12:
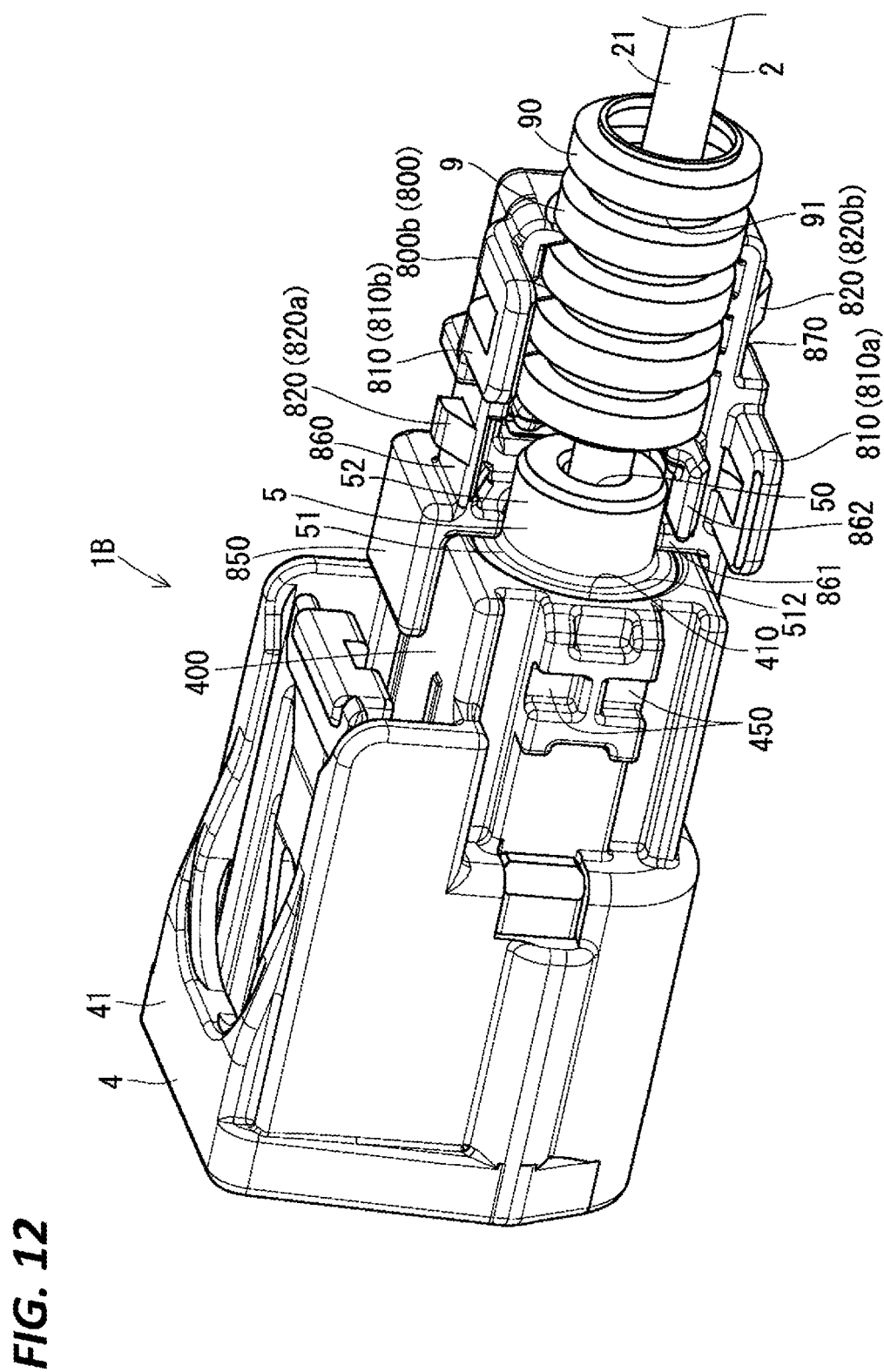
FIG. 12 is a perspective view showing the example of the communication cable according to the second embodiment.

The communication cable 1B according to a second embodiment is described. FIG. 11 is a schematic perspective view of the communication cable 1B. FIG. 12 is a schematic perspective view showing a state where the communication cable 1B shown in FIG. 11 is so turned that the tip of a housing 4 of the communication cable 1B is located on a left side of FIG. 12. FIG. 12 shows a state where a first member 800a of a holder 8 is removed from the communication cable 1B.

The communication cable 1B includes the holder 8 instead of the holder 6 in the aforementioned communication cable 1A, and further includes a corrugated tube 9.

The corrugated tube 9 is a tubular member and, for example, made of insulating resin. The corrugated tube 9 is located behind a rubber plug 5. The corrugated tube 9 covers the outer periphery of a communication line 2. Specifically, the corrugated tube 9 covers the outer periphery of a part behind the rubber plug 5, out of the communication line 2.

In the corrugated tube 9, annular projections 90 and annular recesses 91 are alternately arranged along a longitudinal direction thereof. The annular projection 90 is an annular convex part when viewed from an outer peripheral side of the corrugated tube 9. This part constitutes an annular concave shape when viewed from an inner peripheral side of the corrugated tube 9. The annular recess 90 is an annular concave part when viewed from the outer peripheral side of the corrugated tube 9. This part constitutes an annular convex shape when viewed from the inner peripheral side of the corrugated tube 9. Since the corrugated tube 9 is easily resiliently deformable at step parts and the like between the annular projections 90 and the annular recess 91, the corrugated tube 9 has a property of being easily bent and deformed in a single state.

The holder 8 is mounted on the housing 4 and holds the rubber plug 5. The holder 8 covers the outer peripheral surface of an outer side portion 52 of the rubber plug 5 over the entire periphery, similarly to the holder 6. For example, the holder 8 covers the entire region of the outer peripheral surface of the outer side portion 52. The holder 8 may or may not be in contact with the outer peripheral surface of the outer side portion 52 of the rubber plug 5. If the holder 8 is in contact with the outer peripheral surface of the outer side portion 52, the holder 8 may be in contact with the outer peripheral surface of the outer side portion 52 over the entire periphery.

Further, the holder 8 covers the outer periphery of the corrugated tube 9 and holds the corrugated tube 9. For example, the holder 9 covers the outer peripheral surface of the corrugated tube 9 over the entire periphery. The corrugated tube 9 extends further rearward than the holder 8 and includes a part exposed from the holder 8.

The holder 8 is divided into the first member 800a and a second member 800b. For example, the first and second members 800a, 800b have the same shape. Hereinafter, the first and second members 800a, 800b may be respectively referred to as partial members 800 unless it is particularly necessary to distinguish these.

The holder 8 is divided into two partial members 800 along a longitudinal direction of the communication line 2. One partial member 800 covers one circumferential half of the outer peripheral surface of a part of the communication line 2, and the other partial member 800 covers the remaining circumferential half of the outer peripheral surface of the part of the communication line 2.

As shown in FIGS. 11 and 12, the two partial members 800 include a plurality of coupling parts 80. The plurality of coupling parts 80 are provided on an outer peripheral surface 8a of the holder 8. In this example, four coupling parts 80 are provided on the outer peripheral surface 8a of the holder 8. The four coupling parts 80 include two coupling part 80a located on a relatively front side and two coupling part 80b located on a relatively rear side.

One coupling part 80a is located on a side opposite to and spaced 180° from the other coupling part 80a in a circumferential direction of the communication line 2. Further, one coupling part 80b is located on a side opposite to and spaced 180° from the other coupling part 80b in the circumferential direction of the communication line 2. Hereinafter, for the two coupling parts 80a, one may be referred to as a first coupling part 80a and the other may be referred to as a second coupling part 80a. Further, for the two coupling parts 80b, one may be referred to as a third coupling part 80b and the other may be referred to as a fourth coupling part 80b.

The first coupling part 80a is juxtaposed with the third coupling part 80b in the longitudinal direction of the communication line 2. It can be said that the first and third coupling parts 80a, 80b are juxtaposed one behind the other. The second coupling part 80a is juxtaposed with the fourth coupling part 80b in the longitudinal direction of the communication line 2.

At each coupling part 80, a fitting projection 820 of the other partial member 800 is fit to a substantially U-shaped and cantilevered fitting piece 810 of the one partial member 800. The fitting projection 820 is inserted into the substantially U-shaped fitting piece 810 and fit to the fitting piece 810. Note that the number of the coupling parts 80 is not limited to that in this example. Further, the positions where the coupling parts 80 are provided are not limited to those in this example.

Hereinafter, the fitting piece 810 and the fitting projection 820 in the coupling part 80a on the front side of the holder 8 may be respectively called a fitting piece 810a and a fitting projection 820a. Further, the fitting piece 810 and the fitting projection 820 in the coupling part 80b on the rear side of the holder 8 may be respectively called a fitting piece 810b and a fitting projection 820b.

Figure 13:
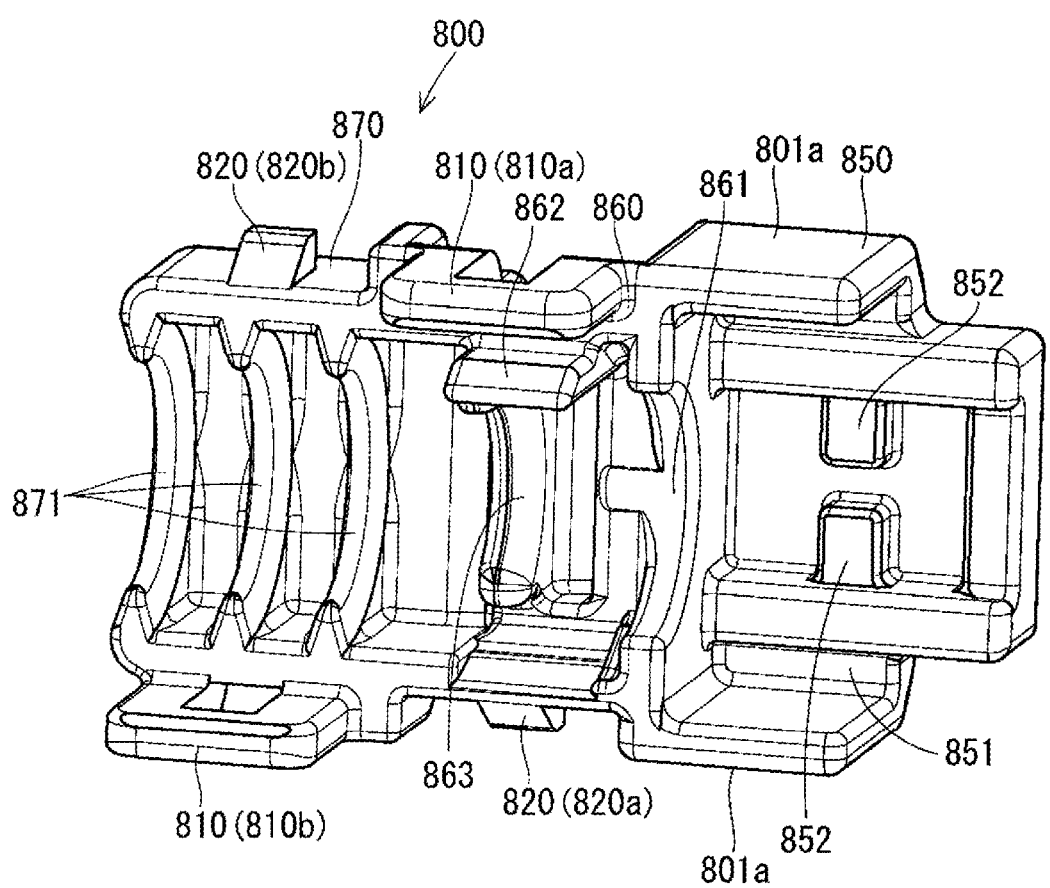
FIG. 13 is a perspective view showing an example of a partial member according to the second embodiment.

FIG. 13 is a schematic perspective view showing an example of the partial member 800. The outer shape of the partial member 800 is substantially U-shaped when viewed from front and rear surface sides thereof. Each partial member 800 includes a housing-side part 850 for partially covering the outer peripheral surface of an accommodating portion 40 of the housing 4, a rubber plug-side part 860 for partially covering the outer peripheral surface of the outer side portion 52 of the rubber plug 5 and a corrugated-side part 870 for partially covering the outer periphery of the corrugated tube 9.

The housing-side part 850 is configured similarly to the housing-side part 650 of the aforementioned partial member 600. The housing-side part 850 covers one circumferential half of the outer peripheral surface of a rear end part 400 of the accommodating portion 40. The housing-side part 850 may or may not be in contact with the outer peripheral surface of the rear end part 400. The housing-side part 850 includes a plurality of fitting projections 852 on an inner peripheral surface 851 thereof. In this example, the housing-side part 850 includes two fitting projections 852. By fitting the two fitting projections 852 respectively into two fitting recesses 450 provided in the rear end part 400 of the accommodating portion 40, the partial member 800 is positioned with respect to the housing 4.

The rubber plug-side part 860 covers one circumferential half of the outer peripheral surface of the outer side portion 52 of the rubber plug 5. The rubber plug-side part 860 includes a wall portion 861 for covering the one half of the outer peripheral surface near a boundary with a close-contact portion 51 on the outer side portion 52 of the rubber plug 5. The wall portion 861 may or may not be in contact with the outer side portion 52 of the rubber plug 5. The wall portion 861 may be in contact with the entire region of the one half of the outer peripheral surface near the boundary with the close-contact portion 51 on the outer side portion 52.

The wall portion 861 covers one circumferential half of the protruding surface 512 behind the close-contact portion 51. The wall portion 861 may or may not be in contact with the protruding surface 512. The wall portion 861 may be in contact with the entire region of the one circumferential half of the protruding surface 512. The wall portion 861 of the holder 8 covers a part of the protruding surface 512 behind the close-contact portion 51, whereby the close-contact portion 51 is less likely to come out from the accommodating portion 40.

The rubber plug-side part 860 includes one fitting projection 820a on the outer peripheral surface thereof. It can be also said that the fitting projection 820a is provided on a peripheral wall portion of the rubber plug-side part 860. Further, the rubber plug-side part 860 of the partial member 800 includes the fitting piece 810a projecting from the outer peripheral surface thereof up to the outer peripheral surface of the rubber plug-side part 860 of the other partial member 800. The fitting piece 810a is located on a side opposite to and spaced 180° from the fitting projection 820a in the circumferential direction of the communication line 2.

Further, the rubber plug-side part 860 of the partial member 800 includes a projecting portion 862 projecting from the inner peripheral surface thereof up to the inner peripheral surface of the rubber plug-side part 860 of the other partial member 800 to face the fitting piece 810a. A part of the rubber plug-side part 860 of the other partial member 800 is inserted into a clearance between the fitting piece 810a and the projecting portion 862 on the partial member 800. Further, the rubber plug-side part 860 includes a reinforcing wall portion 863 for reinforcing the projecting portion 862 on the inner peripheral surface thereof.

The corrugated-side part 870 covers one circumferential half of the outer peripheral surface of the corrugated tube 9. The corrugated-side part 870 includes a plurality of semicircular projections 871 on the inner peripheral surface thereof. The plurality of semicircular projections 871 are respectively fit into the plurality of annular recesses 91 of the corrugated tube 9. In this example, the corrugated-side part 870 includes three semicircular projections 871. The three semicircular projections 871 are respectively fit into three annular recesses 91 on a front side, out of the plurality of annular recesses 91 of the corrugated tube 9. The annular projections 90 of the corrugated tube 9 are fit into clearances between the semicircular projections 871. Further, out of the plurality of annular projections 90 of the corrugated tube 9, the foremost annular projection 90 is arranged between the foremost semicircular projection 871, out of the three semicircular projections 871, and the reinforcing wall portion 863 of the rubber plug-side part 860.

The corrugated-side part 870 includes one fitting projection 820b on the outer peripheral surface thereof. It can be said that the fitting projection 820b is provided on a peripheral wall portion of the corrugated-side part 870. The corrugated-side part 870 of the partial member 800 also includes one fitting piece 810b projecting from the outer peripheral surface thereof up to the outer peripheral surface of the corrugated-side part 870 of the other partial member 800. The fitting piece 810b is located on a side opposite to and spaced 180° from the fitting projection 820b in the circumferential direction of the communication line 2.

The partial member 800 configured as described above is so mounted on the housing 4 that the two fitting projections 852 are respectively fit into the two fitting recesses 450 of the accommodating portion 40 while covering the one half of the outer peripheral surface of the rear end part 400 of the accommodating portion 40 of the housing 4, the one half of the outer peripheral surface of the outer side portion 52 of the rubber plug 5 and the one half of the outer peripheral surface of the corrugated tube 9.

In the case of coupling the two partial members 800, the fitting projection 820a of the other partial member 800 is fit to the fitting piece 810a of the one partial member 800 and the fitting projection 820a of the one partial member 800 is fit to the fitting pieces 810a of the other partial member 800. Further, the fitting projection 820b of the other partial member 800 is fit to the fitting piece 810b of the one partial member 800 and the fitting projection 820b of the one partial member 800 is fit to the fitting piece 810b of the other partial member 800.

When the fitting projection 820a of the other partial member 800 is fit to the fitting piece 810a of the one partial member 800, a part of the peripheral wall portion of the rubber plug-side part 860 of the other partial member 800 is inserted into a clearance between the fitting piece 810a of the one partial member 800 and the projecting portion 862 facing this fitting piece 810a. Then, the fitting projection 820a formed on this part is fit to the fitting piece 810a of the one partial member 800.

In this example, a projecting direction of the fitting piece 810a in the first coupling part 80a on the front side and that of the fitting piece 810a in the second coupling part 80a on the front side are opposite to each other. Similarly, a projecting direction of the fitting piece 810b in the third coupling part 80b on the rear side and that of the fitting piece 810b in the fourth coupling part 80b on the rear side are opposite to each other.

Further, the projecting direction of the fitting piece 810a in the first coupling part 80a on the front side is opposite to that of the fitting piece 810*b* in the third coupling part 80*b* on the rear side juxtaposed with the first coupling part 80*a*. Further, the projecting direction of the fitting piece 810*a* in the second coupling part 80*a* on the front side is opposite to that of the fitting piece 810*b* in the fourth coupling part 80*b* on the rear side juxtaposed with the second coupling part 80*a*.

The first and second members 800*a*, 800*b* have the same shape in the above example, but may have different shapes. In this case, one partial member 800 may cover a region smaller than half of the outer peripheral surface and the other partial member 800 may cover the remaining region of the outer peripheral surface in the circumferential direction of the outer peripheral surface of the outer side portion 52 of the rubber plug 5.

Further, two coupling parts 80 may be provided on the outer peripheral surface 8*a* of the holder 8. In this case, one coupling part 80 may be located on a side opposite to and spaced 180° from the other coupling part 80 in the circumferential direction of the communication line 2. Further, coupling parts 80 of the first and second members 800*a*, 800*b* may be provided on the rear surface of the holder 8.

Further, the holder 8 may not cover a part of the outer peripheral surface of the outer side portion 52 if the holder 8 covers the outer peripheral surface of the outer side portion 52 over the entire periphery. In this case, the holder 8 may cover, for example, the entire region of the outer peripheral surface of front two-thirds of the outer side portion 52, but may not cover at least a part of the outer peripheral surface of the remaining part of the outer side portion 52.

As just described, in the communication cable 1B, the holder 8 holding the rubber plug 5 covers the outer periphery of the corrugated tube 9 and holds the corrugated tube 9. Since the corrugated tube 9 can be held, utilizing the holder 8 for holding the rubber plug 5 in this way, the number of components can be reduced.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A communication cable, comprising:
   a communication line;
   a terminal portion connected to an end part of the communication line;
   a housing for accommodating the terminal portion;
   a waterproof rubber plug to be held in close contact with an outer periphery of the communication line, the rubber plug being partially accommodated in the housing; and
   a holder to be mounted on the housing to hold the rubber plug,
   wherein:
   the rubber plug includes:
      a close-contact portion located behind the terminal portion, the close-contact portion being held in close contact with the outer periphery of the communication line and an inner surface of the housing; and
      an outer side portion located behind the close-contact portion and outside the housing,
      wherein a diameter of the close-contact portion is larger than a diameter of the outer side portion,
   the holder covers an outer peripheral surface of the outer side portion over an entire periphery, and
   the holder is divided into a first member and a second member.

2. The communication cable of claim 1, wherein the holder covers an entire region of the outer peripheral surface of the outer side portion.

3. The communication cable of claim 1, wherein the first and second members have the same shape.

4. The communication cable of claim 1, wherein:
   a rib to be contacted by a front surface of the rubber plug is provided on the inner surface of the housing, and
   a surface of the rib to be contacted by the front surface is located behind the terminal portion.

5. The communication cable of claim 1, wherein:
   the first and second members include a first coupling part, and
   the first coupling part is provided on a rear surface of the holder.

6. The communication cable of claim 5, wherein:
   the first and second members include a second coupling part, and
   the second coupling part is provided on an outer peripheral surface of the holder.

7. The communication cable of claim 1, further comprising a corrugated tube located behind the rubber plug, the corrugated tube covering the outer periphery of the communication line, wherein:
   the holder covers an outer periphery of the corrugated tube and holds the corrugated tube.

8. The communication cable of claim 1, wherein a plurality of projections is formed on an outer peripheral surface of the close-contact portion.

9. The communication cable of claim 1, wherein a rear end surface of the close-contact portion constitutes a protruding surface protruding outward from the outer peripheral surface of the outer side portion,
   the first and second members each include a rubber plug-side part for partially covering the outer peripheral surface of the outer side portion, and
   a front surface of the rubber plug-side part covers one circumferential half of the protruding surface behind the close-contact portion.

\* \* \* \* \*